Figure 1:
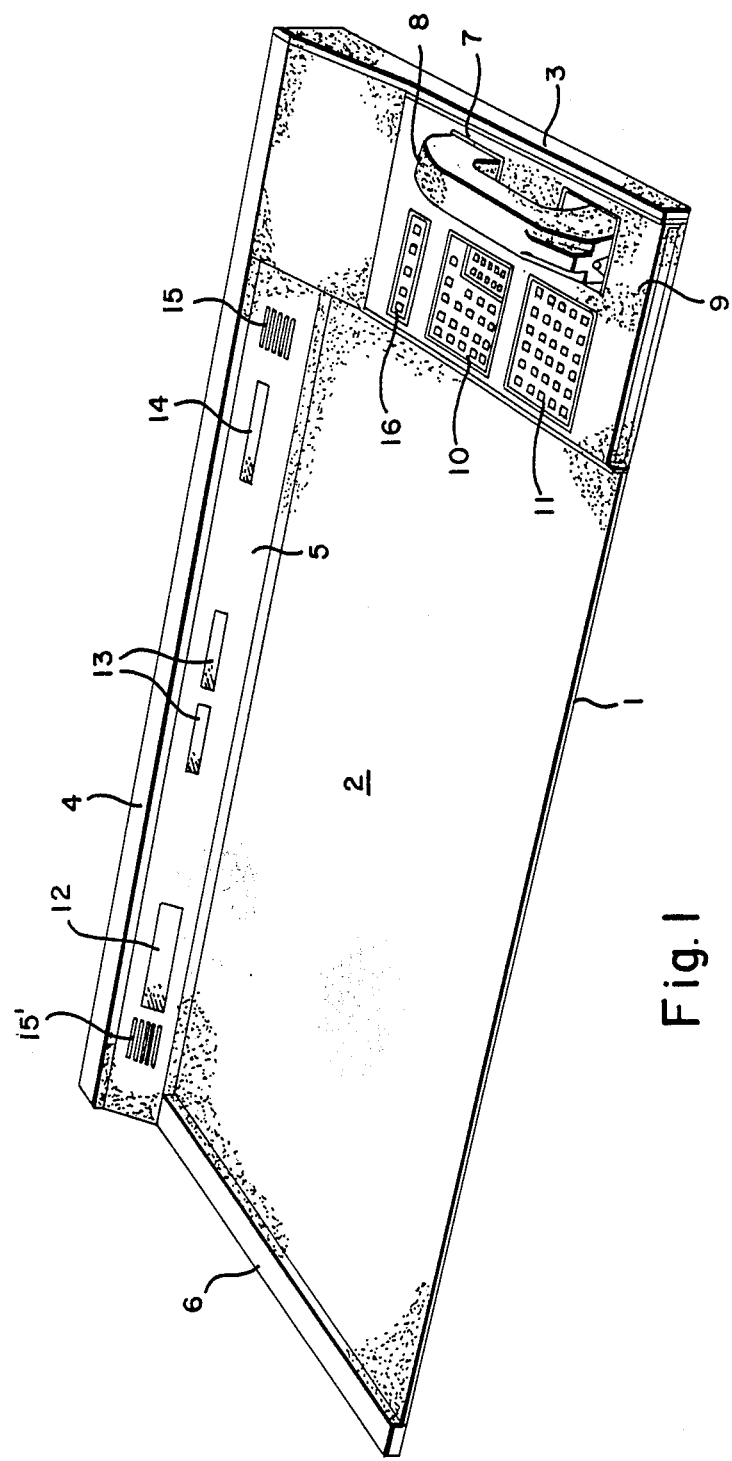

United States Patent [19]

Tuchto

[11] Patent Number: 4,748,574
[45] Date of Patent: May 31, 1988

[54] INTEGRATED EXECUTIVE DESK UNIT

[75] Inventor: Jeff Tuchto, Kanata, Canada

[73] Assignee: TeleQuest Systems Corporation, Ottawa, Canada

[21] Appl. No.: 921,560

[22] Filed: Oct. 21, 1986

Related U.S. Application Data

[63] Continuation of Ser. No. 559,203, Dec. 8, 1983, abandoned.

[30] Foreign Application Priority Data

Jul. 4, 1983 [CA] Canada ................................ 431723

[51] Int. Cl.⁴ .......................... G06F 1/00; G04B 47/00
[52] U.S. Cl. ..................................... 364/705; 368/10; 379/428
[58] Field of Search ........................ 364/700, 705, 708; 368/10–13; 379/96, 354, 355, 428, 436, 440

[56] References Cited

U.S. PATENT DOCUMENTS 3,932,709  1/1976  Hoff et al. ........................... 364/705
4,063,046  12/1977  Schiffman et al. ................. 364/705
4,653,086  3/1987  Laube ................................... 379/96

FOREIGN PATENT DOCUMENTS 56-59360  5/1981  Japan ................................... 364/705

OTHER PUBLICATIONS

"Bell's Visual Terminal Uses Plasma Display", *Electronics*, vol. 49, #7, p. 36, Apr. 1, 1976.
Cutter, "Displayphone: An Interactive Communication Experiment", Conference: Electronic Text Communication, Munich, Germany, pp. 323–329, Jun. 12–15, 1978.
Smartset TM Product Information, published by Technicom International Inc, 23 Old Kings Hwy., Darien, CT 06820, Aug. 1982.

*Primary Examiner*—Gary V. Harkcom
*Assistant Examiner*—Dale M. Shaw
*Attorney, Agent, or Firm*—Norman S. Blodgett; Gerry A. Blodgett

[57] ABSTRACT

An executive desk pad for defining the working area on a desk comprises a generally flat, portable rectangular base having a planar underside for placement on the surface of the desk. The major portion of the upperside of the base forms a writing area in front of a user seated at the desk. The writing area serves exclusively to provide a support surface for documents placed thereon. The base includes a telephone handset mounted thereon and accessible to the user seated at the desk, a visual display visible to a user facing the writing area, a keypad for permitting the user to enter numerical information, and a housing containing electronic circuitry. The electronic circuitry includes a telephone circuit, a calculator, and a clock.

10 Claims, 2 Drawing Sheets

EDO 600 FUNCTIONAL BLOCK DIAGRAM

INTEGRATED EXECUTIVE DESK UNIT

This application is a continuation of Ser. No. 559,203, filed Dec. 8, 1983, now abandoned.

The invention relates to an integrated executive desk unit intended mainly for use in a modern office environment.

In order to operate effectively in today's environment, a modern executive must have access to more and more electronic aids. The most obvious need is for a telephone, which is usually placed on the desk. A calculator is often also required to enable the executives to perform calculations, frequently while holding a telephone conversation. Particularly in the case of a professional office, some form of time keeping device will often be required for the purpose of docketing calls and professional time. The more aids that are employed, the more the desk tends to become cluttered and, for example, during a telephone conversation, the executive may find his calculator momentarily lost under a mass of paper at some critical moment during a discussion. It is important, also, to convey a general impression of efficiency, and a cluttered desk tends to have the opposite effect. Attempts have been made to overcome this problem by incorporating into office furniture individual electronic aids. Such attempts have met with little success because of the lack of versatility and undesirability of being restricted to a limited number of purpose-built desk designs. In a prestigious office, it is often desired, for example, to have high quality, period furniture to match the decor.

In accordance with the present invention, there is provided an executive desk pad for defining the work area on a desk and comprising a generally flat, portable rectangular base member having a planar underside for placement on the surface of the desk and an upperside, the major portion of the upperside forming a writing area in front of a user seated at the desk said writing area serving exclusively to provide a support surface for documents placed thereon, the improvement wherein the base member comprises (a) a telephone hand set mounted thereon and accessible to the user seated at the desk; (b) visual display means mounted on said base member and visible to a user facing the writing area; (c) key pad means accessible to a user facing the writing area for permitting said user to enter numerical information; and (d)(i) a housing mounted on said base member containing electronic circuitry, said electronic circuitry including a telphone circuit for establishing telephone calls with a remote facility, the called number being selected through said key pad means, (ii) means for performing calculations on the number entered through the said key pad means and displaying the results on said visual display means, and (iii) clock means for displaying the time on said visual display means.

In a preferred embodiment of the invention, the functional electronic means includes a telephone and a calculator. The interface means includes a key pad arranged in a shallow box to the right side of the base member, in which is contained the telephone and calculator circuitry. A visual solid-state display is arranged in a housing extending along the far edge of the base member relative to the user. The display is visible through an inclined wall of the housing facing the user. A hand-set for the telephone is received in a cradle mounted in the shallow box. In this embodiment, the user has easy access to the telephone and can see the numbers called in the visual display, as well as the results of calculations performed if desired during a telephone conversation. The display preferably also includes a field for displaying the time of day or a lapse time, for example, during a telephone call.

Figure 2:
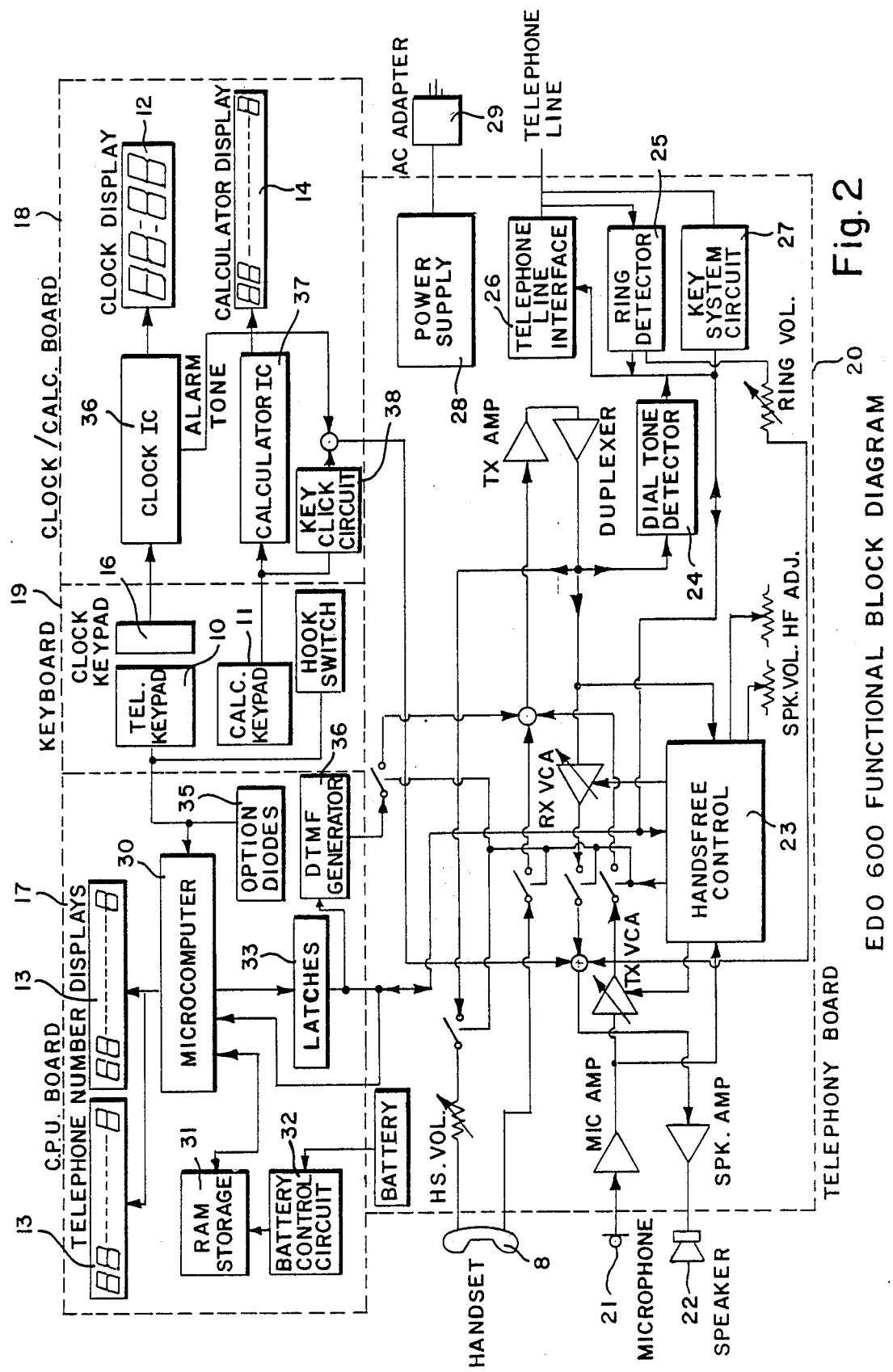

The invention will now be described in more detail, by way of example only, with reference to the accompanying drawings, in which: FIG. 1 is a front perspective view of one embodiment of an executive desk unit in accordance with the invention, and FIG. 2 is a block diagram of the control circuitry.

The executive desk unit shown in FIG. 1 comprises a flat base member 1 having an underside adapted to be placed on a desk surface. The upper side of the base member defines a leather covered writing area 2 for supporting documents, etc. To the right of the writing area is mounted a shallow box 3 and along the far edge of which, relative to the user, is mounted a housing 4 having an inclined front wall 5. The front wall 5 is set at an angle of approximately 45° relative to the plane of the base member 1. A raised bar 6 extends along the left hand edge of the writing area and the front edge, nearest the user, is free to allow easy user access. The unit has cords (not shown) for connection in respect of the two, a power supply, and one or more telephone lines.

A cradle 7 is arranged in the shallow box 3 for receiving telephone handset 8. The front panel 9 of the box 3 incorporates a keypad divided into two parts 10 and 11. The part 10 has ten keys corresponding to the traditional telephone keypad and additional keys providing extra telephone functions to be described later. The part 11 provides a full range of calculator function keys.

The display in the housing 4 has a first field 12 for collectively displaying time of day or elapsed time, a second field 13 for displaying called or stored telephone numbers, and a third field 14 for displaying the results of calculations. Grills 15 and 15' are also provided in the front part of the housing to accommodate a microphone/speaker system to allow hands free operation of the telephone. The clock display field 12 is controlled by an additional keypad 16.

The desk unit, as shown in FIG. 2, comprises four printed circuit boards. essential processing unit board 17 and clock/calculator board 18 are mounted in the housing 4, with their respective displays behind the panel 5, which takes the form of a transparent bezel. A keyboard 19 containing the keypads 10, 11 and 16, and a telephone board 20 are mounted in the shallow box 3.

The telephone board 20 is connected to the telephone handset 8, and microphone 21 and speaker 22 forming part of a hands free speaker system behind the grills 15, 15'. The telephone board 20 includes a hands free control system 23, a dial tone detector 24, a ring detector 25, a telephone line interface 26, key system circuit 27, and various amplifiers and control circuits. A power supply 28 is connected through an external line to an AC adapter 29 for connection to a main supply.

The central processing unit board 17 comprises a microcomputer 30, which drives telephone number displays 13. A random access memory 31 is provided for storing numbers, and a battery control circuit is provided to prevent loss of memory in the event of power failure or disconnection of the power supply. The microcomputer 30 is connected to the telephone board through latches 33 and a DTMF generator 34 is provided to allow both pulse and tone dialing. Option diodes 35 indicate the option selected by the user.

The clock/calculator board 18 includes a clock integrated circuit 36 driving the clock display 12 and a calculator integrated circuit 37 driving the clock display 14. The clock and calculator displays 12 and 14 are associated with the respective integrated circuits and visible through the transparent bezel 5. An optional keyclick circuit 38 is provided to indicate to the user when depression of the keys has resulted in the entry of information into the unit.

The single chip microcomputer 30 is a Mostek 3870 (a trademark) and has 4K bytes of program masked ROM. The program controls the overall operation of the unit plus it provides all the advanced telephone features except for handsfree.

The microcomputer has four I/O ports with which it communicates to the outside world. Through these ports the computer continuously scans the telephone keypad searching for key depressions and during power up it scans the option diodes as well to determine the "status" of the unit. It also continuously multiplexes and updates the two telephone number displays. The computer controls the telephone line interface circuit, the key system circuit and via the handsfree module and telephone board the telephone mode of the unit. The telephone mode may be one of on-hook, off-hook, alerting, predialling, tone dialling, pulse dialling, handset or handsfree modes.

The computer accepts inputs from the dial tone detector, ring detector and key system circuit on the telephone board. These inputs are not buffered whereas the outputs to the telephoney board are beffered by a latch on the CPU board.

The DMTF generator located on the CPU board generates the proper high and low frequency tone pair for tone dialling in response to signals from the computer. These signals are also latches as the same computer is used to control the telephone board. A random access memory (RAM) with capacity of 2048 8-bit words is provided for the storage of up to 112, 30 digit user telephone directory entries. Contents of RAM are maintained for up to 30 days in the event of AC power failure by means of a rechargeable battery located on the telephone board. The battery control circuit ensures that the battery is kept charged and monitors the AC derived power to determine when battery power must be connected to the RAM.

The two 11 digit vacuum fluorescent displays on the CUP board under computer control display telephone keypad entries, recalled telephone directory entries and the call/stopwatch timer.

Power for the CPU board is supplied from the power supply on the telephone board.

The clock and calculator board contains the clock and calculator integrated circuits (IC) plus their displays. Both of these integrated circuits are complete systems requiring only an external keypad and display. Even the display drivers are on the IC's.

The clock keypad is located on the keyboard 19 and allows setting and examination of the clock time, alarm and date. The alarm operates every 24 hours and cannot be disabled.

The clock display is a vacuum flourescent display similar to the telephone number displays.

An alarm tone is output from the clock IC when the preset alarm time is encountered. This tone goes to the telephone board and is sounded by the speaker.

The calculator keypad 11 is also found on the keyboard 19 and it is directly connected to the calculator IC 37. This device is a business oriented calculator with three memories and 12 digit results. Again the display is of vacuum floursecent technology and is driven by the calculator.

The keyclick circuit senses calculator keypad entries and generates a click whenever a key is depressed. This click is also routed through the telephone board to the speaker to provide key entry audible feedback to the user.

The keyboard 19 is a printed circuit board that provides the contact areas for keys in the telephone, clock and calculator keypads. Each keypad is laid out in an X-Y matrix.

A hook switch is located on this board which indicates to the microcomputer whether or not the handset is in its cradle on the console.

The telephone line interface 26 couples the unit to the telephone line. Coupling is achieved by a transformer which also provides the proper DC load to the line. The two relays in the line interface are under control of the microcomputer and implement the hookswitch and dial pulsing functions.

Ring detection is accomplished by a tone ringer IC 25 which is connected to the line when the unit is off-hook. Its tone output is applied to the speaker amplifier 41 to provide audible alerting. The tone is also converted to a logic level and input to the microcomputer.

The key system 27 interface allows the unit to work as a single line key telephone with a 1A2 or equivalent key system. The lamp status of the connected line is detected and fed to the microcomputer. The interface also contains a relay which is used to control the A lead of the connected line. In conjunction with the hookswitch relay in the telephone line interface it provides for proper operation of the key system.

The telephone line interface is coupled to a duplexer 42 and a transmit amplifier 43. The duplexer 42 provides sidetone suppression of transmitted audio and gain in the receive direction.

The transmit amplifier 43 combines and amplifies signal from the DIMF generator, the handset microphone and the handsfree microphone. Signals from the handsfree microphone are also applied to the handsfree transmit channel.

Received signals are gated to the handset receiver 8 and handsfree receive channel. They are also applied to the dial tone detector 24 which gives logic level output whenever dial tone is present. This signal is sent to the CPU board.

A level control is provided to allow the user to adjust the handset receiver volume.

The handsfree section consists of a transmit channel, receive channel and a control circuit.

The transmit channel consists of a fixed gain amplifier and a voltage controlled amplifier. Its source of input is the handsfree microphone.

The receive channel is comprised of a voltage controlled amplifier and its source of input is the handsfree microphone.

The control circuit compares signals from the handsfree microphone, received speech from the far end set and the volume setting of the handsfree switching or not. Switching is necessary if the volume of sound from the speaker is sufficient to cause acoustic feedback due to coupling with the handsfree microphone. When switching is required, the handsfree circuit is put into either the transmit or received mode by switching the voltage controlled amplifier in each direction.

A volume control is provided for the user to adjust the level of sound coming from the speaker.

Part of the control circuit is also used to direct the flow of audio signals by controlling various analog switches, DTMF transmission and the handset are the other parts of the telephone board besides the handsfree circuit that are controlled by these switches.

Low voltage AC is supplied to the power supply by an external wall mount transformer (AC adapter). Some of the voltage is routed directly to the clock/calculator and microprocessor boards as a filament voltage for the vacuum flourescent displays. Three regulator circuits convert the low voltage AC into the +5, +12, and −22 volts required by the circuits in the unit. An additional +10 volts is derived from the +12 volts.

The described executive desk unit can be placed on any office or other desk without the need for special modifications. The executive has at his fingertips all the equipment he is likely to need, and if he wishes to change the desk, all he has to do is lift off the portable unit and place it on the new desk. The remainder of the desk is free to give a neat uncluttered appearance, or to accomodate books and papers or decorative objects.

I claim:

1. In an executive desk pad for defining the working area on a desk and comprising a generally flat, portable rectangular base member having a planar underside for placement on the suface of the desk and an upperside, the major portion of the upperside forming a writing area in front of a user seated at the desk, said writing area serving exclusively to provide a support surface for documents placed thereon, the improvement wherein the base member comprises (a) a telephone handset mounted thereon and accessible to the user seated at the desk; (b) visual display means mounted on said base member and visible to a user facing the writing area; (c) keypad means accessible to a user facing the writing area for permitting said user to enter numerical information; and (d) (i) a housing mounted on said base member containing electronic circuitry, said electronic circuitry including a telephone circuit for establishing telephone calls with a remote facility, the called number being selected through said keypad means, (ii) means for performing calculations on number entered through said keypad means and displaying the results on said visual display means, and (iii) clock means for displaying the time on said visual display means.

2. An exective desk pad as claimed in claim 1, wherein said visual display means is mounted in a portion of said housing extending along the far edge of the base member.

3. An executive desk pad as claimed in claim 2, wherein said circuitry also includes means for displaying called numbers on said visual display means.

4. An executive desk pad as claimed in claim 3, wherein said visual display means has three fields, namely a first field displaying called numbers, a second filed displaying the time, and a third filed displaying the results of calculations.

5. An executive desk pad as claimed in claim 2, wherein said housing portion extending along the far edge of the base member has an inclined front wall.

6. An executive desk pad as claimed in claim 1, wherein said electronic circuitry further includes means associated with said clock means for timing the duration of telephone calls and displaying the results on said visual display means.

7. An executive desk pad as claimed in claim 1, wherein said electronic circuitry further includes a directory memory for storing telephone numbers and means are provided for selectively recalling said stored numbers and establishing communication therewith.

8. An executive desk pad as claimed in claim 1, further comprising a selectively operable handsfree speakerphone connected to said telephone circuit.

9. An executive desk pad as claimed in claim 1, wherein said keypad means comprises two separate parts, namely a first part for entering telephone numbers and a second part for entering numbers on which calculations are to be performed.

10. An executive desk pad as claimed in claim 1, wherein said housing includes a shallow box mounted to one side of the writing area, said keypad means being located on said shallow box.

* * * * *